April 22, 1930.  A. KREBS  1,755,882
WELDING TORCH
Filed Dec. 6, 1926    2 Sheets-Sheet 1

Inventor
Adolf Krebs
by Roberts Cushman & Woodbury
Attys.

Inventor
Adolf Krebs
by Roberts Cushman & Woodberry
Att'ys.

Patented Apr. 22, 1930

1,755,882

UNITED STATES PATENT OFFICE

ADOLPH KREBS, OF JAMAICA PLAIN, MASSACHUSETTS

WELDING TORCH

Application filed December 6, 1926. Serial No. 152,771.

The present invention relates to a welding or cutting apparatus and more particularly to an oxy-acetylene welding device of novel form particularly adapted for the welding of metals.

In the usual form of oxy-acetylene and other fuel gas torches heretofore employed for welding purposes a single flame is used or straight, parallel multiple flames of moderate velocity are employed so as to avoid blowing the molten metal away which would render the welding operation difficult if not impossible to carry out. Such flames are not sufficiently concentrated, however, for the most economical heat application, for the reason that the flames are too broad, spreading uselessly over the adjoining parts of the line of welding or of the seam, thus resulting in the loss of heat.

Although the oxy-acetylene flame develops a temperature substantially equivalent to that of the electric arc, the heat effect of the oxy-acetylene torch and its speed of operation are materially lower, which is due apparently to the fact that the oxy-acetylene flame, as generally used, spreads its heat over a larger area than does the electric arc; or, in other words, the electric arc applies or concentrates its heat more nearly to a point, whereby a greater speed of operation is attained.

The results which are obtained with the electric arc are not entirely satisfactory, however, because of numerous pinholes which are formed in the weld, and because of chemical reactions which take place in the weld during the welding operation under the influence of the nitrogen and oxygen of the surrounding air. By the use of the oxy-acetylene flame, however, these disturbing elements or effects which interfere with obtaining the highest quality of weld are avoided; and if, therefore, a higher heat concentration than that normally attained could be produced with the oxy-acetylene torch, or, in other words, if a higher flame velocity could be produced with a reduction of the velocity at the point or place of welding so as not to blow away the metal at the weld, then oxy-acetylene welding could be carried on with a speed of operation substantially that of the electric arc and would also produce welds of much higher quality.

One of the objects of my invention is to provide an improved form of oxy-acetylene welding device by means of which a substantially uniform weld may be obtained without a loss of welding heat.

Another object of the invention is to provide an improved form of oxy-acetylene torch adapted to attain a highly concentrated heat with a comparatively low speed of the gases over the weld so as to prevent the blowing away of metal during the welding operation.

Another object of the invention is to provide means for controllably feeding metal into the heating zone of an oxy-acetylene flame so as to cause it to melt to supply the necessary amount of filling metal at the seam or portion to be welded, and to provide means for withdrawing during the welding operation the metal rod or material from which the metal is fed to the heating zone, thus serving to interrupt intermittently the feed of metal without interrupting the welding operation.

Another object of the invention is to provide means for moving the torch or the flame in any desired or predetermined path so as to permit the welding operation to be readily controlled to obtain a uniform heat treatment at the portions to be welded.

Another object of the invention is to provide a form of welding apparatus in which the force of the flame may be employed for assisting in bringing together the bent up edges or sides of the seam during the welding operation.

Another object of the invention is to provide a novel form of welding device adapted to produce a resultant flame from a plurality of impinging flames in which the speed of the gases is lower than that in the branch or impinging flames.

A further object of the invention is to provide a new and improved process for the welding of seams by means of the oxy-acetylene flame.

With these and other objects in view the invention comprises the various features hereinafter more fully described and particularly defined in the claims.

The various features of the invention are illustrated in their preferred form in the accompanying drawings, together with certain modifications.

Figure 1:
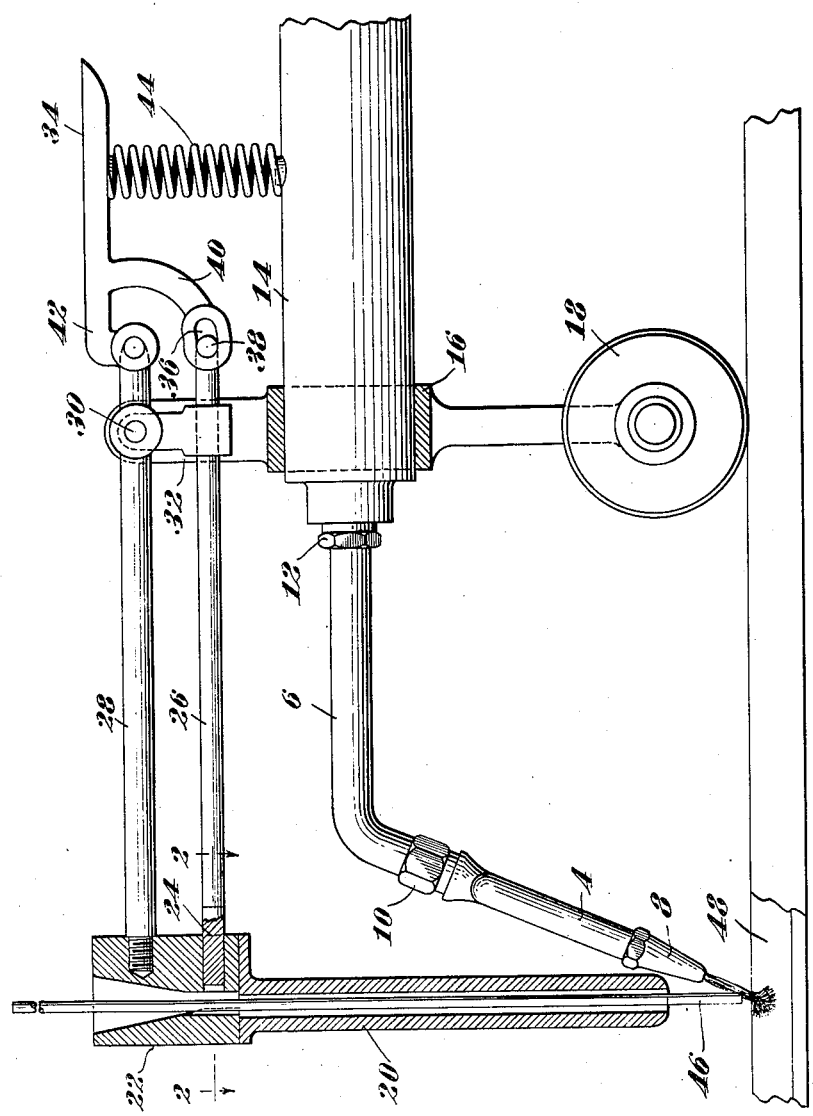
Fig. 1 is a view in elevation partly in section of my improved form of welding apparatus.
Figure 2:
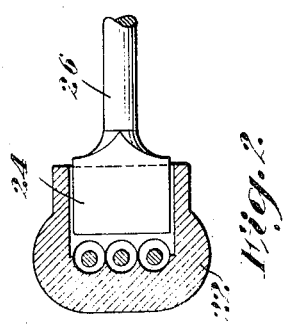
Fig. 2 is a cross-sectional view taken on the line 2—2 of Fig. 1.

Referring more in detail to the drawings, the invention comprises a welding torch having preferably two branch arms 2 and 4 which are so disposed as to direct the flames emitted from the nozzles toward each other, or toward a common point, so as to form a resultant flame in which the speed of the gases is less than that in either of the branch flames. By combining the flames in this manner a combined or resultant flame is produced having a greater heat intensity than either of the branch flames. It is possible that the heat of the resultant flame is increased through the impact or friction of the branch flames in impinging on each other, and, furthermore, that the high temperature of the resultant flame is due in part to the fact that combustion of the burning gases is completed in the resultant flame. Whatever may be the explanation of the results obtained, it is a fact that the temperature of the resultant flame is higher than that of the branch flames and that speed of its component gases is lower than that of the branch flames, whereby a more rapid and more homogeneous welding action is produced. The form of the resultant flame is dependent upon the angle of impact of the impinging branch flames, the preferred angle of impact being from about 60 to 90 degrees, whereby a very short, knife-like flame is produced. A protecting atmosphere is formed during the welding operation around the molten metal, or at the point at which the metal is to be welded which apparently prevents the formation of compounds such as the nitride of iron, for example. It is obvious that the flame velocity of the resultant flame is decreased if the angle of impact is increased, and vice verse, the flame velocity is increased with a decreasing angle of impact, the flame velocity being at a maximum when the angle of impact is zero, or when the two branches are parallel and the flames are projected in the same direction. I may employ any suitable means for varying the angle between the branch flames as will be apparent to those skilled in the art, and no specific form of means for this purpose need therefore be shown.

The branch arms of the torch may be of any suitable form although I preferably employ a pair of curved arms 2, 4 rigidly connected to a pipe 6 through which oxygen and acetylene are conducted. At the ends of the arms I may employ any suitable form of nozzle 8 by means of which combustion of the acetylene is controlled. The branch arms may be connected in any suitable way, such as by means of the sleeve or union 10 to a pipe 6, the pipe 6 being preferably connected by means of a coupling 12 to a pipe 14 which is supported by means of a carriage 16 to which is connected one or more rollers 18 by means of which the torch may be moved in any predetermined path along the seam or portion of the metal to be welded. By this means also the flame system may be moved up and down toward or away from the work, the rollers serving as a pivot for this purpose.

In order to supply metal during the welding operation so as to fill the seam at the portion to be welded, I preferably provide a casing or sleeve 20 having a head portion 22 in which a movable member 24 is mounted which is connected to a rod 26 which is adapted to be pressed inwardly so as to hold one or more metal rods in fixed position or to permit movement thereof during the welding operation. The tube or casing 20, in its normal position, preferably extends downwardly substantially to a point just above the nozzle 8, so as to permit feeding the metal rods directly into or in heat receiving relation to the oxy-acetylene flame so as to be melted. Attached to the member 22 at one end is a rod 28 which is preferably rigidly connected thereto and is pivotally connected at the point 30 to an upstanding member 32 connected to the carriage 16, the other end of the rod 28 being pivotally connected to an arm 42 of a hand lever 34. The hand lever 34 is also connected to one end of the rod 26 so as to permit sliding movement thereof, being preferably connected thereto by means of a slot and pin connection 36, 38, the slot 36 being formed in an arm 40 of the hand lever in the manner indicated in Fig. 1 of the drawings. The hand lever 34 is preferably mounted in proximity to the pipe 14 being normally held in raised position by a spring 44 so as to retain the hand lever in a position in which the rod-holding means 24 is disengaged from the metal rods 46.

During the operation of the device after the torch has been lighted in the usual manner the carriage is moved on the rollers 18 until the torch is in the desired position for welding, and the metal rods 46 are adjusted in position with respect to the flame so that the ends of the rods will be heated and gradually melted during the welding operation so as to supply the desired amount of metal.

Figure 3:
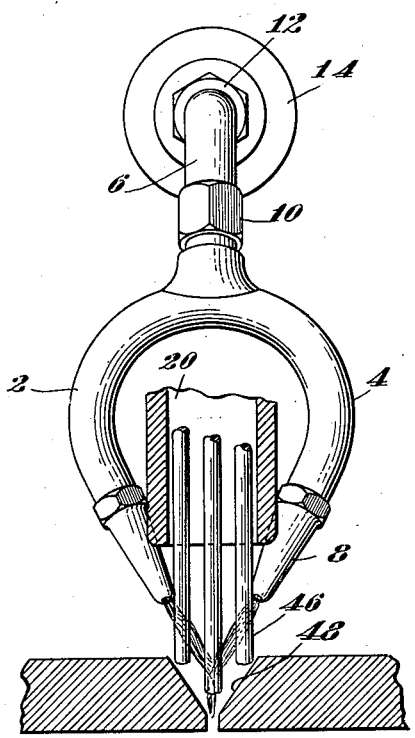
Fig. 3 is a profile view partly in section taken from the left in Fig. 1.

In carrying out the welding operation I preferably form a groove 48 at the seam or joint to be welded, which is preferably V-shaped in cross section, the sides of the groove being preferably parallel to the branch flames (see Fig. 3) so as to permit access of the oxy-acetylene flame to below the upper surface of the joint to be welded and to provide for heating the sides of the groove. The welding flame is preferably held in such a position in the groove that the branch flames hug the sides of the V-groove until the filling metal from the rods accumulates in the groove, after which the rods are intermittently raised or dropped in filling in as required, the welding operation being carried on in the usual manner. In this way the maximum welding heat of the resultant flame is applied during the welding operation at the spot where the maximum amount of filler material is to be applied. The rods 46 are fed intermittently by releasing the pressure on the hand lever 34, which is raised by means of the spring 44, whereby the inner end of the slot 36 engages the pin 38 on the rod 26 and releases the member 24 from pressure contact with the rods. Thus if it is desired to lower the rods in order to feed additional metal to the seam or spot to be welded, the lever 34 is momentarily released causing the pressure of the holding means 24 to be released from the rods permitting them to move downwardly until the lever 34 is again pressed downwardly against the tension of the spring 44 causing the member 24 to move into engagement with the rods. After the desired amount of metal has been fed to the seam or joint to be welded the rods may be moved out of heat receiving relation to the flame by pressing the lever 34 sufficiently to cause the rod feeding mechanism to swing in an upward direction around the pivot 30, which is caused by the downward pressure on both the rod 28 and the forward pressure of the arm 40 on the rod 26. The heating of the joint by means of the oxy-acetylene flame may then be continued until the welded joint is completed, the apparatus being moved along the seam to weld the portions thereof in the usual manner.

Figure 5:
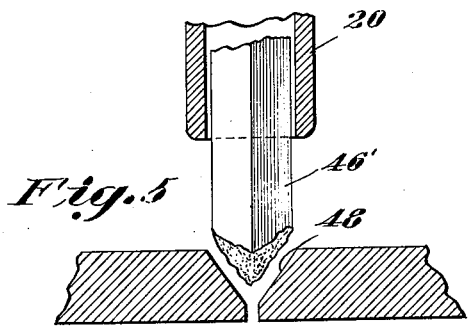
Fig. 5 is a view of a modified form of metal rod and a portion of the feeding mechanism employed for supplying metal during the welding operation.
Figure 6:
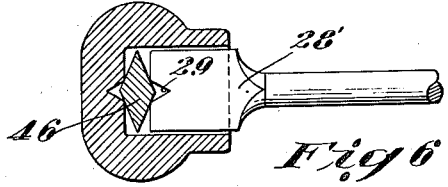
Fig. 6 is a cross-sectional view of a modified form of holding means for a metal rod to be fed during the welding operation.

A modified form of rod and rod-holding means is illustrated in Figs. 5 and 6 in which a single rod is employed conforming in shape in cross section so as to supply the amount of metal necessary at each portion of the groove across the seam. The single rod 46' which is shown in cross section in Fig. 6 is preferably held by means of a member 28' having a groove 29 therein of any form suitable for holding the rod in position. It is to be understood that the shape and size of the groove 48 may be varied depending upon the thickness of the metal to be welded and other factors as will be apparent to those skilled in the art.

Figure 4:
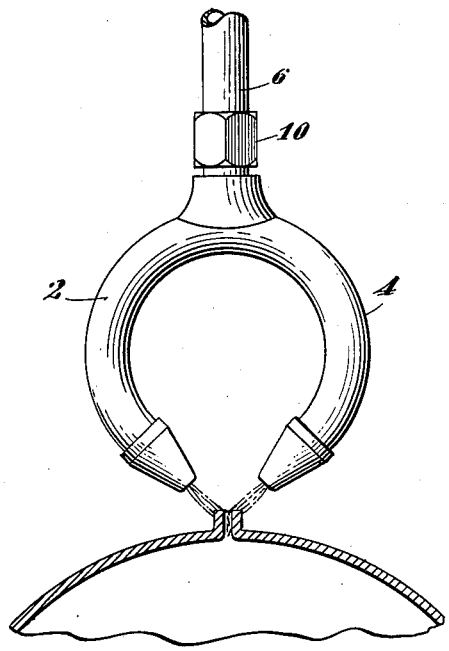
Fig. 4 is a view showing the manner in which the torch may be applied for uniting the upturned abutting edges of a seam.

Instead of using the above method of welding it may be found advantageous in certain cases, particularly if the metal to be welded is thin, to bend the metal upwardly at the joint to be welded, in the manner shown in Fig. 4. This method of welding is preferably employed without the use of any filler material, the flame being directed to the joint in a manner such that the branch flames melt the bent-up portions and blow or force them together, the resultant flame being then directed to the seam in such a way as to concentrate the heat at the line of the seam without affecting or distorting the portions at the side of the seam.

It has been found that by using the concentrated heat of the united or resultant flame in this manner the welding operation may be carried on much more rapidly and with the production of a better joint than may be accomplished by the use of the ordinary form of oxy-acetylene torch.

It is to be understood that modifications may be made in the apparatus and its mode of application without departing from the spirit or scope of the invention. I may, for example, employ a greater number than two branch arms so as to provide a larger number of flames which may impinge at a single point or at a number of points. I may use, for example, a number of pairs of flames so as to impinge on each other at a number of points along a seam so as to produce substantially a line or seam in which the heat is concentrated sufficiently to produce welding.

Figure 7:
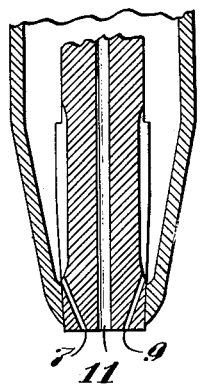
Fig. 7 is a cross-sectional view of a form of nozzle by means of which an oxy-acetylene flame is produced which is particularly adapted for cutting.

The form of the oxy-acetylene torch which has been described is adapted more particularly for the welding of metals, although it may be employed for cutting operations by concentrating the flames to the centre point so that the cutting oxygen finds a highly heated ignition spot at the point where it strikes. For the purpose of cutting metals, however, I preferably employ the form of torch illustrated in Fig. 7 of the drawings in which acetylene or any gas mixed with oxygen is supplied through two converging passageways 7, 9 in the nozzle and oxygen is supplied through a central passageway 11 whereby a resultant flame of high heat intensity may be produced just at the spot where the cutting oxygen strikes, thus allowing a very quick cutting start.

I claim:

1. In a device for welding metal, a burner adapted to produce a high-temperature, low-velocity flame, means for permitting movement of the burner along a predetermined path, means for controllably feeding metal into the flame of the burner at the portions to be welded, and means for moving the metal feeding means away from the flame of the burner during the welding operation.

2. In a device of the kind described, a burner having branch arms directed toward each other for directing flames therefrom toward a common point to form a resultant flame adapted to provide a high welding temperature without causing melted metal to be blown away, means for feeding metal to the joint to be welded during the welding operation, and means for removing the metal feeding means from the welding zone without interrupting the welding operation.

3. In a device of the class described, a burner having two branch arms each arm being adapted to emit a high temperature flame in a direction to cause the flames to impinge on each other so as to form an angle between them said angle being of the order of 60 to 90 degrees, and means for feeding metal to be melted by the heat of the flames in proportion to the amount required at each portion of the cross section of the joint to be welded.

4. In a device of the class described an oxy-acetylene torch having branch arms adapted to emit oxy-acetylene flames therefrom toward a common point to form a resultant flame in a plane substantially midway between the flames emitted from the branch arms, and providing a heated zone, a metal feeding device adapted to feed metal into the heated zone for filling the seam or portion to be welded, a carriage for the torch mounted upon rollers, a lever for controlling the feed of metal from the metal holding means, and means whereby the metal holding means may be lifted away from the heated zone by the operation of said lever.

Signed by me at Boston, Massachusetts, this 2nd day of December, 1926.

ADOLPH KREBS.